United States Patent
Kato et al.

(10) Patent No.: US 7,538,068 B2
(45) Date of Patent: May 26, 2009

(54) CARBON DIOXIDE GAS ABSORBENT AND METHOD OF MANUFACTURING THE SAME

(75) Inventors: Masahiro Kato, Naka-gun (JP); Toshihiro Imada, Yokohama (JP); Kenji Essaki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 456 days.

(21) Appl. No.: 11/376,062

(22) Filed: Mar. 16, 2006

(65) Prior Publication Data

US 2006/0211570 A1 Sep. 21, 2006

(30) Foreign Application Priority Data

Mar. 18, 2005 (JP) .............. 2005-080476

(51) Int. Cl.
B01J 20/04 (2006.01)
B01J 20/10 (2006.01)
C01B 33/32 (2006.01)
C01B 37/02 (2006.01)
C01D 15/00 (2006.01)

(52) U.S. Cl. .............. 502/407; 423/179.5; 423/325; 423/326; 423/332; 423/333; 423/334; 423/592.1; 423/593.1; 423/594.15; 423/641; 502/344; 502/411; 96/108; 501/11; 501/39; 501/53; 501/80; 501/154

(58) Field of Classification Search .......... 423/179.5, 423/325, 326, 332–334, 592.1, 593.1, 594.15, 423/641; 502/344, 407, 411; 96/108; 501/11, 501/39, 53, 80, 154; 23/293 R, 295 R, 302 R
See application file for complete search history.

(56) References Cited

U.S. PATENT DOCUMENTS

| 6,387,845 | B1 | 5/2002 | Masahiro et al. |
| 6,712,879 | B2 | 3/2004 | Kato et al. |
| 2002/0037810 | A1* | 3/2002 | Nakagawa et al. .......... 502/407 |
| 2003/0075050 | A1* | 4/2003 | Kato et al. .................... 96/108 |
| 2003/0232722 | A1 | 12/2003 | Kato et al. |
| 2005/0025682 | A1 | 2/2005 | Essaki et al. |
| 2005/0214203 | A1 | 9/2005 | Essaki et al. |

FOREIGN PATENT DOCUMENTS

| JP | 7-3182 | 1/1995 |
| JP | 9-30809 | 2/1997 |
| JP | 9-99214 | 4/1997 |
| JP | 2000-262890 | 9/2000 |
| JP | 2001-157841 | 6/2001 |
| JP | 2001-170480 | 6/2001 |
| JP | 2003-326159 | 11/2003 |
| JP | 2004-195328 | 7/2004 |

OTHER PUBLICATIONS

U.S. Appl. No. 11/535,303, filed Sep. 26, 2006, Imada, et al.
U.S. Appl. No. 11/551,955, filed Oct. 23, 2006, Imada, et al.
U.S. Appl. No. 11/534,046, filed Sep. 21, 2006, Essaki, et al.
U.S. Appl. No. 11/686,531, filed Mar. 15, 2007, Imada, et al.

* cited by examiner

Primary Examiner—Timothy C Vanoy
Assistant Examiner—Serena L Hanor
(74) Attorney, Agent, or Firm—Oblon, Spivak, McClelland, Maier & Neustadt, P.C.

(57) ABSTRACT

A carbon dioxide gas absorbent includes a porous body containing a lithium complex oxide. The porous body includes pores having a pore diameter distribution such that main pores which consist of first pores with a diameter of 10 to 100 μm and second pores with a diameter larger than 100 μm and 500 μm or smaller occupy 80 to 100%, third pores with a diameter smaller than 10 μm occupy 0 to 10% and fourth pores with a diameter larger than 500 μm occupy 0 to 10%, the main pores have a pore diameter distribution such that the first pores occupy 15 to 85% and second pores occupy 15 to 85%.

17 Claims, No Drawings ent and a method of manufacturing the absorbent and relates particularly to a carbon dioxide absorbent with improved porosity and a method of manufacturing the carbon dioxide absorbent with improved porosity.

CARBON DIOXIDE GAS ABSORBENT AND METHOD OF MANUFACTURING THE SAME

CROSS-REFERENCE TO RELATED APPLICATIONS

This application is based upon and claims the benefit of priority from prior Japanese Patent Application No. 2005-080476, filed Mar. 18, 2005, the entire contents of which are incorporated herein by reference.

BACKGROUND OF THE INVENTION

1. Field of the Invention

The invention relates to a carbon dioxide absorbent and a method of manufacturing the absorbent and relates particularly to a carbon dioxide absorbent with improved porosity and a method of manufacturing the carbon dioxide absorbent with improved porosity.

2. Description of the Related Art

Carbon dioxide gas exhausted out of a combustion apparatus for burning fuel mainly containing hydrocarbons of a power generator has a temperature as high as about 300° C. or higher at a discharge gas releasing part which is at a site suitable for recovery.

On the other hand, as a conventionally well-known method of separating carbon dioxide gas are a method of using cellulose acetate and a chemical absorption method of using an alkanol amine type solvent. However, the above-mentioned separation methods require the temperature of a gas to be introduced to be about 200° C. or lower. Accordingly, it is needed for the discharge gas for reheating at a high temperature such as carbon dioxide gas discharged out of a combustion apparatus to be cooled to about 200° C. or lower by a heat exchanger, a cooling tower, or the like. Therefore, the energy consumption amount for separating carbon dioxide gas is high.

In such a carbon dioxide gas separation method, Jpn. Pat. Appln. KOKAI Publication No. 9-99214 discloses use of a lithium zirconate-containing carbon dioxide gas absorbent and Jpn. Pat. Appln. KOKAI Publication Nos. 2000-262890 and 2001-170480 disclose use of lithium silicate-containing carbon dioxide gas absorbents. These lithium zirconate- or lithium silicate-containing carbon dioxide gas absorbents are capable of absorbing carbon dioxide gas in a temperature range from room temperature to about 500° C. and release carbon dioxide gas when being heated at a temperature of about 600° C. or higher. Further, these carbon dioxide gas absorbents have an advantageous point that they can repeat absorption and desorption. Further, there is described that addition of carbonates of alkali metals selected from lithium, sodium, and potassium to these carbon dioxide gas absorbents accelerates the absorption reaction of carbon dioxide.

However in the case absorption and desorption of carbon dioxide gas by these carbon dioxide gas absorbents are repeated, the absorption amount of carbon dioxide gas is gradually decreased and it consequently becomes difficult to maintain a stable carbon dioxide absorption characteristic for a long duration.

BRIEF SUMMARY OF THE INVENTION

According to first aspect of the present invention, there is provided a carbon dioxide gas absorbent comprising a porous body containing a lithium complex oxide, wherein the porous body includes pores having a pore diameter distribution such that main pores which consist of first pores with a diameter of 10 to 100 μm and second pores with a diameter larger than 100 μm and 500 μm or smaller occupy 80 to 100%, third pores with a diameter smaller than 10 μm occupy to 0 to 10% and fourth pores with a diameter larger than 500 μm occupy 0 to 10%, the main pores have a pore diameter distribution such that the first pores occupy 15 to 85% and second pores occupy 15 to 85%.

According to second aspect of the present invention, there is provided a method of manufacturing a carbon dioxide gas absorbent, comprising:

preparing mixed powders by mixing lithium carbonate powders and silicon dioxide powders, the lithium carbonate powders has a grain size distribution such that main powders which consist of first powders with a diameter of 1 to 10 μm and second powders with a diameter larger than 10 μm and 300 μm or smaller occupy 80 to 100% by weight, third powders with a diameter smaller than 1 μm occupy 0 to 10% by weight and fourth powders with a diameter larger than 300 μm occupy 0 to 10% by weight, the main powders have a grain size distribution such that the first powders occupy 15 to 85% by weight and second powders occupy 15 to 85% by weight, the silicon dioxide powders have the same grain size distribution of the lithium carbonate powders;

molding the mixed powders; and heating the molded body to 700° C. or higher.

DETAILED DESCRIPTION OF THE INVENTION

Hereinafter, a carbon dioxide gas absorbent and a method of manufacturing the same according to one embodiment of the invention will be described more in detail.

The carbon dioxide gas absorbent according to the embodiment is a carbon dioxide gas absorbent comprising porous body containing a lithium complex oxide. The porous body includes pores having a pore diameter distribution such that main pores which consist of first pores with a diameter of 10 to 100 μm and second pores with a diameter larger than 100 μm and 500 μm or smaller occupy 80 to 100%, third pores with a diameter smaller than 10 μm occupy 0 to 10% and fourth pores with a diameter larger than 500 μm occupy 0 to 10%, the main pores have a pore diameter distribution such that the first pores occupy 15 to 85% and second pores occupy 15 to 85%.

The porous body more practically has the following a pore diameter distribution.

(1) A porous body includes pores having a pore diameter distribution such that main pores which consist of first pores with a diameter of 10 to 100 μm and second pores with a diameter larger than 100 μm and 500 μm or smaller occupy 100%, the main pores have a pore diameter distribution such that the first pores occupy 15 to 85% and second pores occupy 15 to 85%.

(2) A porous body includes pores having a pore diameter distribution such that main pores which consist of first pores with a diameter of 10 to 100 μm and second pores with a diameter larger than 100 μm and 500 μm or smaller occupy 90 to 100% and third pores with a diameter smaller than 10 μm occupy less than 10%, the main pores have a pore diameter distribution such that the first pores occupy 15 to 85% and second pores occupy 15 to 85%.

(3) A porous body includes pores having a pore diameter distribution such that main pores which consist of first pores with a diameter of 10 to 100 μm and second pores with a diameter larger than 100 μm and 500 μm or smaller occupy 90 to 100% and fourth pores with a diameter larger than 500 μm occupy less than 10%, the main pores have a pore diameter distribution such that the first pores occupy 15 to 85% and second pores occupy 15 to 85%.

(4) A porous body includes pores having a pore diameter distribution such that main pores which consist of first pores with a diameter of 10 to 100 μm and second pores with a diameter larger than 100 μm and 500 μm or smaller occupy 80 to 100%, third pores with a diameter smaller than 10 μm occupy less than 10% and fourth pores with a diameter larger than 500 μm occupy less than 10%, the main pores has a pore diameter distribution such that the first pores occupy 15 to 85% and second pores occupy 15 to 85%.

As the lithium complex oxide, for example, lithium silicates may be used. Among these lithium silicates, $Li_4SiO_4$ is most preferable since it has a high carbon dioxide gas absorption property. The chemical formula may allow a slight composition difference from the stoichiometric composition.

The porous body preferably has a porosity of 30 to 70% by volume, and more preferably, 20 to 40% by volume.

The first pores are mainly relevant to the capability of the carbon dioxide gas absorbent for absorbing and desorbing carbon dioxide gas. The first pores desirably have a pore distribution such that pores with a diameter of 30 to 70 μm occupy 50% or more, more preferably at least 60% based on the total amount of the first pores. The carbon dioxide gas absorption and desorption capability can further be improved by adjusting the pore diameter distribution of the first pores to be in the narrow range as described above.

The second pores compensate for the decrease in the surface area owing to the grain growth of the porous carbon dioxide gas absorbent and also preventing collapse of pores during the repeat used of carbon dioxide gas absorption and desorption, particularly high temperature carbon dioxide gas desorption (for example, in the case of lithium silicate, 600° C. or higher) and thus maintain the carbon dioxide gas absorption capability (that is, improve the cycle property of carbon dioxide gas absorption and desorption). The second pores desirably have a pore distribution such that pores with a diameter of 100 to 300 μm occupy 50% or more, more preferably at least 60% based on the total amount of the second pores. The second pores more preferably have a pore distribution such that pores with a diameter of larger than 150 μm and 300 μm or smaller occupy at least 50% based on the total amount of the second pores. A reduced surface area can more reliably be compensated for and the carbon dioxide gas absorption capability can be maintained for a longer period by adjusting the pore diameter distribution of the second pores to be in the narrow range as described above.

If the first pores occupied in the main pores are adjusted to be lower than 15%, the capability of the carbon dioxide gas absorbent for absorbing carbon dioxide gas is possibly decreased. On the other hand, if the first pores occupied in the main pores exceed 85%, the second pores occupied in the main pores are relatively decreased and it may possibly result in difficulty to improve the cycle property of the carbon dioxide gas absorption and desorption. The main pores preferably have a pore diameter distribution such that the first pores occupy 35 to 65% and second pores occupy 35 to 65%. The main pores more preferably have a pore diameter distribution such that the first pores occupy 35 to 50% and second pores occupy 50 to 65%.

The main pores may have a pore diameter distribution such that the first pores and the second pores are adjusted to be higher for either ones or same for both pores. That is, in the case of designing a carbon dioxide gas absorbent whose capability of absorbing carbon dioxide gas is more emphasized, it is preferable to control the pore diameter distribution of the first pores to be higher than that of the second pores. Meanwhile, in the case of designing a carbon dioxide gas absorbent whose cycle property of the carbon dioxide gas absorption and desorption is more emphasized, it is preferable to control the pore diameter distribution of the second pores to be higher than that of the first pores.

The third pores in the pores including the porous body preferably occupy 0 to 8%. The fourth pores in the pores including the porous body preferably occupy 0 to 8%.

The third pores desirably have a pore diameter distribution such that pores with a diameter of 1 to 5 μm occupy at least 50%, more preferably at least 60% based on the total amount of the third pores. The fourth pores desirably have a pore diameter distribution such that pores with a diameter of 500 to 600 μm occupy at least 50%, more preferably at least 60% based on the total amount of the fourth pores.

The porous carbon dioxide gas absorbent of the embodiment may further contain at least one alkali metal carbonate selected from lithium carbonate, sodium carbonate, and potassium carbonate. These alkali metal carbonates are existed in the porous body within grain boundaries. These alkali metal carbonates are effective in improving the carbon dioxide gas absorption property.

It is preferable to contain the alkali metal carbonates in an amount of 0.5 to 10% by mole based of the total amount of the lithium complex oxide and the alkali metal carbonates. If the amount of the alkali metal carbonates is lower than 0.5% by mole, it becomes difficult to improve the carbon dioxide gas absorption property of the alkali metal carbonates. On the other hand, if the amount of the alkali metal carbonates exceeds 10% by mole, not only the effect of the alkali metal carbonates for improving the carbon dioxide gas absorption property is saturated but also the ratio of the lithium complex oxide in the carbon dioxide gas absorbent is decreased to result in possible decrease of the absorption amount and absorption speed of carbon dioxide gas. Particularly, control of the amount of the alkali metal carbonates to be 0.5 to 5% by mole improves the carbon dioxide gas absorption property while suppressing deterioration of the carbon dioxide gas absorbent and maintaining the cycle property of the carbon dioxide gas absorption and desorption.

The carbon dioxide gas absorbent of the embodiment may have any shape, such as a pellet form or a spherical shape.

Next, the method of manufacturing the carbon dioxide gas absorbent according to the invention will be described.

First, lithium carbonate powders and silicon dioxide powders are mixed to obtain mixed powders. The lithium carbonate powders have a grain size distribution such that main powders which consist of first powders with a diameter of 1 to 10 μm and second powders with a diameter larger than 10 μm and 300 μm or smaller occupy 80 to 100% by weight, third powders with a diameter smaller than 1 μm occupy 0 to 10% by weight and fourth powders with a diameter larger than 300 μm occupy 0 to 10% by weight, the main powders have a grain size distribution such that the first powders occupy 15 to 85% by weight and second powders occupy 15 to 85% by weight. The silicon dioxide powders have the same grain size distribution of the lithium carbonate powders. Subsequently, the mixed powders are molded and the molded body is heated to 700° C. or higher to produce a porous carbon dioxide gas absorbent having the above-mentioned structure and containing lithium silicate.

The lithium carbonate powders and silicon dioxide powders practically have a grain size distribution as follows.

(1) Lithium carbonate powders and silicon dioxide powders have a grain size distribution such that main powders which consist of first powders with a diameter of 1 to 10 μm and second powders with a diameter larger than 10 μm and 300 μm or smaller occupy 100% by weight, the main powders have a grain size distribution such that the first powders occupy 15 to 85% by weight and second powders occupy 15 to 85% by weight, respectively.

(2) Lithium carbonate powders and silicon dioxide powders have a grain size distribution such that main powders which consist of first powders with a diameter of 1 to 10 μm and second powders with a diameter larger than 10 μm and 300 μm or smaller occupy 90 to 100% by weight and third powders with a diameter smaller than 1 μm occupy less than 10% by weight, the main powders have a grain size distribution such that the first powders occupy 15 to 85% by weight and second powders occupy 15 to 85% by weight, respectively.

(3) Lithium carbonate powders and silicon dioxide powders have a grain size distribution such that main powders which consist of first powders with a diameter of 1 to 10 μm and second powders with a diameter larger than 10 μm and 300 μm or smaller occupy 90 to 100% by weight and fourth powders with a diameter larger than 300 μm occupy less than 10% by weight, the main powders have a grain size distribution such that the first powders occupy 15 to 85% by weight and second powders occupy 15 to 85% by weight, the silicon dioxide powders have the same grain size distribution of the lithium carbonate powders, respectively.

(4) Lithium carbonate powders and silicon dioxide powders have a grain size distribution such that main powders which consist of first powders with a diameter of 1 to 10 μm and second powders with a diameter larger than 10 μm and 300 μm or smaller occupy 80 to 100% by weight, third powders with a diameter smaller than 1 μm occupy less than 10% by weight and fourth powders with a diameter larger than 300 μm occupy less than 10% by weight, the main powders have a grain size distribution such that the first powders occupy 15 to 85% by weight and second powders occupy 15 to 85% by weight, the silicon dioxide powders have the same grain size distribution of the lithium carbonate powders, respectively.

The first powders in the main powders composing the lithium carbonate powders and silicon dioxide powders preferably have a grain size distribution such that powders with a diameter of 1 to 5 μm occupy at least 50% by weight, more preferably at least 60% by weight based on the total amount of the first powders. The second powders in the main powders composing the respective powders desirably have a grain size distribution such that powders with a diameter of 50 to 300 μm occupy at least 50% by weight, more preferably at least 60% by weight based on the total amount of the second powders. Particularly, the second powders desirably have a grain size distribution such that powders with a diameter of 100 to 200 μm occupy at least 40% by weight, more preferably at least 50% by weight based on the total amount of the second powders.

The third powders in the lithium carbonate powders and silicon dioxide powders preferably occupy 0 to 3% by weight. The fourth powders in the lithium carbonate powders and silicon dioxide powders preferably occupy 0 to 3% by weight.

The third powders desirably have a grain size distribution such that powders with a diameter of 0.1 to 1 μm occupy at least 50% by weight, more preferably at least 60% by weight based on the total amount of the third powders. The fourth powders desirably have a grain size distribution such that powders with a diameter of 300 to 400 μm occupy at least 50% by weight, more preferably at least 60% by weight based on the total amount of the fourth powders.

The method of molding the mixed powders may be a die pressing method, an extrusion molding method, or the like.

The above-mentioned heating treatment is carried out by promoting the reaction of lithium carbonate powders and silicon dioxide powders, and if the temperature is lower than 700° C., it becomes difficult to sufficiently promote the reaction of these powders. The temperature for the heating treatment is preferably 850° C. or lower.

In the method of manufacturing the carbon dioxide gas absorbent of the embodiment, at least one alkali metal carbonate selected from the group consisting of lithium carbonate, sodium carbonate, and potassium carbonate may be used. Production of such a absorbent comprises: mixing lithium carbonate powders, silicon dioxide powders described above, and fine alkali metal carbonate powders with an average particle diameter of 0.5 to 5 μm; molding the mixed powders; and heating the molded body to 700° C. or higher to produce a porous body of lithium silicate containing the alkali metal carbonates within the grain boundaries of the porous body. In the manufacturing process, the alkali metal carbonate powders are preferably mixed in an amount of 0.5 to 10% by mole based of the lithium carbonate powders, the silicon dioxide powders and the alkali metal carbonate powders.

The inventors have made investigations into the causes of deterioration of the cycle property of the carbon dioxide gas absorption and desorption of the porous carbon dioxide gas absorbent and have found that the deterioration is attributed to grain growth in the carbon dioxide gas absorbent at the time of the heat treatment in the production of the carbon dioxide gas absorbent, and also, absorption and desorption of carbon dioxide gas at a high temperature. Especially, since the carbon dioxide gas desorption reaction is carried out at a high temperature, the grain growth of the carbon dioxide gas absorbent becomes significant. When the grains of the porous carbon dioxide gas absorbent grow, the pores of the carbon dioxide gas absorbent are decreased and blocked. Therefore, the surface area of the carbon dioxide gas absorbent is decreased, resulting in the deterioration of the carbon dioxide gas absorption property.

Accordingly, the inventors have found that it is possible to make the function of the first pores among the main pores to be steady absorption and desorption of carbon dioxide gas, and the function of the second pores among the main pores to be prevention of shrinkage of the pores attributed to the grain growth in the case of carbon dioxide gas absorption and desorption at a high temperature. Accordingly, suppression of the surface area decrease of the carbon dioxide gas absorbent is enabled by the structure in which the porous body includes pores having a pore diameter distribution such that main pores which consist of first pores with a diameter of 10 to 100 μm and second pores with a diameter larger than 100 μm and 500 μm or smaller occupy 80 to 100%, third pores with a diameter smaller than 10 μm occupy 0 to 10% and fourth pores with a diameter larger than 500 μm occupy 0 to 10%, the main pores have a pore diameter distribution such that the first pores occupy 15 to 85% and second pores occupy 15 to 85% As a result, the inventors have found a carbon dioxide gas absorbent capable of maintaining the absorption and desorption property for a long duration in the case of repeating the carbon dioxide gas absorption and desorption.

Further, the inventors have found that it is possible to obtain a porous carbon dioxide gas absorbent having an improved carbon dioxide gas absorption property by adding at least one alkali metal carbonate selected from lithium carbonate, sodium carbonate, and potassium carbonate. That is, the carbon dioxide gas absorption property can be improved due to the fact that the alkali metal carbonate liquefies solid lithium carbonate formed on the surface of the carbon dioxide gas absorbent by carbon dioxide gas absorption and thereby increases the diffusion speed of the carbon dioxide gas on the surface of the carbon dioxide gas absorbent.

In this connection, in the case where the alkali metal carbonate is contained in the carbon dioxide gas absorbent, since the melting point of the alkali metal carbonate is low, the alkali metal carbonate is liquefied in the case of carbon dioxide gas absorption and desorption at a high temperature. The surface of the carbon dioxide gas absorbent is wetted by liquefying the carbonate and as described above, the state of increased carbon dioxide gas absorption is produced. However, on the other hand, the alkali metal carbonate in the liquefied phase wets the surface of the carbon dioxide gas absorbent and lowers the surface energy to result in the possibility of particles composing the absorbent growing. The carbon dioxide gas absorbent of the embodiment has the second pores with a larger diameter together with the first pores and is thus provided with a structure that inhibits particle growth and therefore addition of the alkali metal carbonate can further suppress the particle growth and further improve the carbon dioxide gas absorption property.

According to the method of the embodiment, the porous carbon dioxide gas absorbent capable of capable of maintaining the absorption and desorption property for a long duration in the case of repeating the carbon dioxide gas absorption and desorption can be obtained by mixing lithium carbonate powders and silicon dioxide powders, the lithium carbonate powders having a grain size distribution such that main powders which consist of first powders with a diameter of 1 to 10 μm and second powders with a diameter larger than 10 μm and 300 μm or smaller occupy 80 to 100% by weight, third powders with a diameter smaller than 1 μm occupy 0 to 10% by weight and fourth powders with a diameter larger than 300 μm occupy 0 to 10% by weight, the main powders have a grain size distribution such that the first powders occupy 15 to 85% by weight and second powders occupy 15 to 85% by weight. The silicon dioxide powders have the same grain size distribution of the lithium carbonate powders, and the silicon dioxide powders having the same grain size contribution of the lithium carbonate powders; molding the mixed powders; and heating the molded body to 700° C. or higher.

Hereinafter, the invention will be described in more detail.

EXAMPLES 1 TO 3 AND COMPARATIVE EXAMPLE 1

Lithium carbonate powders and silicon dioxide powders having grain size distributions shown in Table 1, respectively were prepared. Successively, these lithium carbonate powders and silicon dioxide powders were mixed and the mixed powders were molded into a pellet-like shape with a diameter of 5 mm and a height of 5 mm by pressure of 1,000 kg/cm$^2$ by a die press. The obtained molded bodies were heated to 700° C. to produce four types of porous lithium silicate pellets (carbon dioxide gas absorbents). These porous lithium silicate pellets all had a porosity of 60% by volume.

TABLE 1

| | Grain size distribution of lithium carbonate powders and silicon dioxide powders | | | | | | | | |
|---|---|---|---|---|---|---|---|---|---|
| | Main powders (wt %) | | | | | | | | fourth powders [diameter Z (μm); |
| | First powders [diameter: x (μm)] | | | | Second powders [diameter: y (μm)] | | | | |
| | $1 \leq x < 3$ | $3 \leq x \leq 5$ | $5 < x \leq 7$ | $7 < x \leq 10$ | $10 < y < 50$ | $50 \leq y < 100$ | $100 \leq y \leq 200$ | $200 < y \leq 300$ | $300 < z \leq 500$] (wt %) |
| Example 1 | 12 | 26 | 15 | 9 | 2 | 6 | 18 | 8 | 4 |
| Example 2 | 10 | 21 | 12 | 7 | 3 | 8 | 24 | 10 | 5 |

TABLE 1-continued

Grain size distribution of lithium carbonate powders and silicon dioxide powders

| | Main powders (wt %) | | | | | | | | fourth powders [diameter Z (μm); 300 < z ≦ 500] (wt %) |
|---|---|---|---|---|---|---|---|---|---|
| | First powders [diameter: x (μm)] | | | | Second powders [diameter: y (μm)] | | | | |
| | 1 ≦ x < 3 | 3 ≦ x ≦ 5 | 5 < x ≦ 7 | 7 < x ≦ 10 | 10 < y < 50 | 50 ≦ y < 100 | 100 ≦ y ≦ 200 | 200 < y ≦ 300 | |
| Example 3 | 7 | 15 | 9 | 5 | 4 | 10 | 30 | 13 | 7 |
| Comparative Example 1 | 17 | 37 | 21 | 13 | 1 | 2 | 5 | 3 | 1 |

The pore diameter distributions of the obtained porous lithium silicate pellets of Examples 1 to 3 and Comparative Example 1 were measured by BET method using ASAP-240 manufactured by Shimadzu Corp. The results are shown in the following Table 2.

Further, each of the obtained porous carbon dioxide gas absorbents of Examples 1 to 3 and Comparative Example 1 was put in a box type electric furnace and subjected to carbon dioxide gas absorption by being kept at 500° C. for 1 hour under a condition of circulating a gas mixture of 20% by volume of carbon dioxide gas and 80% by volume of nitrogen gas in the electric furnace to measure the carbon dioxide gas absorption amount by investigating the weight increase of the absorbent before and after the absorption. In this case, during the absorption reaction, since the output power of the electric furnace was kept constant to be 500° C. even if the temperature was increased, the temperature of the absorbent might possibly be higher than 500° C. The result (initial absorption amount) is shown in the following Table 2. Additionally, in this measurement, the same experiment was carried out except that only nitrogen gas was supplied to the electric furnace in which each of the carbon dioxide gas absorbents of Examples and Comparative Example was put to find that no weight increase was observed for any of the carbon dioxide gas absorbents.

Next, each of the obtained carbon dioxide gas absorbents of Examples 1 to 3 and Comparative Example 1 was subjected to carbon dioxide gas adsorption by being kept in the electric furnace at 500° C. for 1 h under a condition of circulating a gas mixture of 20% by volume of carbon dioxide gas and 80% by volume of nitrogen gas and carbon dioxide gas desorption by being kept at 800° C. for 1 h after carbon dioxide gas absorption repeatedly 100 times and finally cooled back to a room temperature after carbon dioxide gas absorption by being kept at 500° C. for 1 h, and then the weight increase was investigated. The ratio of the absorption amount after repeat of carbon dioxide gas adsorption and desorption 100 times to the initial absorption amount is shown as the absorption amount retention ratio in the following Table 2.

TABLE 2

| | Pore diameter distribution of porous carbon dioxide gas absorbent | | | | | | | | fourth pores [diameter Z (μm); 500 < z ≦ 600] (%) | Carbon dioxide gas absorption property | |
|---|---|---|---|---|---|---|---|---|---|---|---|
| | Main pores (%) | | | | | | | | | | |
| | First pores [diameter: x (μm)] | | | | Second pores [diameter: y (μm)] | | | | | Initial value (% by weight) | Retention ratio (%) |
| | 10 ≦ x < 30 | 30 ≦ x < 50 | 50 ≦ x ≦ 70 | 70 < x ≦ 100 | 100 < y ≦ 150 | 150 < y ≦ 200 | 200 < y ≦ 300 | 300 < y ≦ 500 | | | |
| Example 1 | 16 | 20 | 14 | 9 | 3 | 6 | 16 | 11 | 5 | 14 | 85 |
| Example 2 | 11 | 16 | 9 | 6 | 6 | 9 | 24 | 13 | 6 | 12 | 88 |
| Example 3 | 7 | 14 | 8 | 6 | 4 | 11 | 29 | 13 | 8 | 11 | 90 |
| Comparative Example 1 | 18 | 37 | 23 | 12 | 2 | 2 | 3 | 2 | 1 | 16 | 53 |

As shown in Table 2, the porous carbon dioxide gas absorbents of Examples 1 to 3 have an initial absorption amount and an absorption amount retention ratio both higher than those of the porous carbon dioxide gas absorbent of Comparative Example 1. Additionally, it is supposed that a decrease in the absorption amount retention ratio of the porous carbon dioxide gas absorbent of Comparative Example 1 is attributed to occurrence of particle growth of the carbon dioxide gas absorbent.

EXAMPLES 4 TO 6 AND COMPARATIVE EXAMPLE 2

Mixed powders were prepared by adding 2% by mole of fine potassium carbonate powders with an average diameter of 1 μm to the lithium carbonate powders and silicon dioxide powders having the grain size distributions shown in Table 1. Successively, these mixed powders were molded into pellet-like shape with a diameter of 5 mm and a height of 5 mm by a pressure of 1,000 kg/cm$^2$ by a die press. The obtained molded bodies were heated at 700° C. to produce four types of porous lithium silicate pellets containing potassium carbonate (carbon dioxide gas absorbents). These porous lithium silicate pellets all had a porosity of 60% by volume.

The pore diameter distributions of the obtained porous lithium silicate pellets of Examples 4 to 6 and Comparative Example 2 were measured by the BET method using ASAP-240, manufactured by Shimadzu Corp. The results are shown in the following Table 3.

Further, with respect to the carbon dioxide gas absorbents of Examples 4 to 6 and Comparative Example 2, the absorption amount (initial absorption amount) of carbon dioxide gas and the absorption amount retention ratio were measured in the same methods as those in Examples 1. The results are shown in the following Table 3.

absorbent of Comparative Example 2 is attributed to further promoting of particle growth of the carbon dioxide gas absorbent by addition of potassium carbonate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A carbon dioxide gas absorbent comprising a porous body containing a lithium complex oxide, wherein the porous body includes pores having a pore diameter distribution such that main pores which consist of first pores with a diameter of 10 to 100 μm and second pores with a diameter larger than 100 μm and 500 μm or smaller occupy 80 to 100%, third pores with a diameter smaller than 10 μm occupy 0 to 10% and fourth pores with a diameter larger than 500 μm occupy 0 to 10%, the main pores having a pore diameter distribution such that the first pores occupy 15 to 85% and second pores occupy 15 to 85%.

2. The carbon dioxide gas absorbent according to claim 1, wherein the lithium complex oxide is lithium silicate.

3. The carbon dioxide gas absorbent according to claim 1, wherein the lithium complex oxide is lithium orthosilicate.

4. The carbon dioxide gas absorbent according to claim 1, wherein the first pores have a pore distribution such that pores with a diameter of 30 to 70 μm occupy 50% or more based on the total amount of the first pores.

5. The carbon dioxide gas absorbent according to claim 1, wherein the second pores have a pore distribution such that pores with a diameter of 100 to 300 μm occupy 50% or more based on the total amount of the second pores.

TABLE 3

| | Pore diameter distribution of porous carbon dioxide gas absorbent | | | | | | | | fourth pores | Carbon dioxide gas absorption property | |
|---|---|---|---|---|---|---|---|---|---|---|---|
| | Main pores (%) | | | | | | | | | | |
| | First pores [diameter: x (μm)] | | | | Second pores [diameter: y (μm)] | | | | [diameter Z (μm); | Initial value | |
| | 10 ≦ x < 30 | 30 ≦ x < 50 | 50 ≦ x ≦ 70 | 70 < x ≦ 100 | 100 < y ≦ 150 | 150 < y ≦ 200 | 200 < y ≦ 300 | 300 < y ≦ 500 | 500 < z ≦ 600] (%) | (% by weight) | Retention ratio (%) |
| Example 4 | 17 | 20 | 13 | 11 | 4 | 5 | 14 | 10 | 6 | 28 | 83 |
| Example 5 | 11 | 14 | 9 | 9 | 6 | 8 | 25 | 11 | 7 | 26 | 86 |
| Example 6 | 9 | 13 | 9 | 6 | 4 | 10 | 30 | 10 | 9 | 25 | 88 |
| Comparative Example 2 | 19 | 36 | 24 | 12 | 2 | 3 | 2 | 1 | 1 | 30 | 45 |

As shown in Table 3, the porous carbon dioxide gas absorbents of Examples 4 to 6 have a high initial absorption amount as compared with that of the porous carbon dioxide gas absorbent of Comparative Example 2 and also a high absorption amount retention ratio even if they contain potassium carbonate.

Additionally, it is supposed that decrease of the absorption amount retention ratio of the porous carbon dioxide gas 6. The carbon dioxide gas absorbent according to claim 1, wherein the porous body has a porosity of 30 to 70% by volume.

7. The carbon dioxide gas absorbent according to claim 1, wherein the main pores have a pore diameter distribution such that the first pores occupy 35 to 65% and second pores occupy 35 to 65%.

8. The carbon dioxide gas absorbent according to claim 1, wherein the main pores have a pore diameter distribution such that the first pores occupy 35 to 50% and second pores occupy 50 to 65%.

9. The carbon dioxide gas absorbent according to claim 1 further containing at least one alkali metal carbonate selected from the group consisting of lithium carbonate, sodium carbonate, and potassium carbonate.

10. The carbon dioxide gas absorbent according to claim 9, wherein the alkali metal carbonate is contained in an amount of 0.5 to 10% by mole based on the total amount of the lithium complex oxide and the alkali metal carbonates.

11. A method of manufacturing a carbon dioxide gas absorbent, comprising:

preparing mixed powders by mixing lithium carbonate powders and silicon dioxide powders, the lithium carbonate powders having a grain size distribution such that main powders which consist of first powders with a diameter of 1 to 10 µm and second powders with a diameter larger than 10 µm and 300 µm or smaller occupy 80 to 100% by weight, third powders with a diameter smaller than 1 µm occupy 0 to 10% by weight and fourth powders with a diameter larger than 300 µm occupy 0 to 10% by weight, the main powders having a grain size distribution such that the first powders occupy 15 to 85% by weight and second powders occupy 15 -to 85% by weight, the silicon dioxide powders having the same grain size distribution of the lithium carbonate powders;

molding the mixed powders into a molded body; and heating the molded body to 700° C. or higher.

12. The method according to claim 11, wherein the first powders have a grain size distribution such that powders with a diameter of 1 to 5 µm occupy 50% by weight or more based on the total amount of the first powders.

13. The method according to claim 11, wherein the second powders have a grain size distribution such that powders with a diameter of 50 to 300 µm occupy 50% by weight or more based on the total amount of the second powders.

14. The method according to claim 11, wherein the main powders of the lithium carbonate powders and silicon dioxide powders have a grain size distribution such that the first powders occupy 35 to 65% by weight and second powders 35 to 65% by weight, respectively.

15. The method according to claim 11, wherein the main powders of the lithium carbonate powders and silicon dioxide powders have a grain size distribution such that the first powders occupy 35 to 50% by weight and second powders 50 to 65% by weight, respectively.

16. The method according to claim 11, wherein at least one alkali metal carbonate selected from the group consisting of lithium carbonate, sodium carbonate, and potassium carbonate is further mixed with the mixed powders.

17. The method according to claim 16, wherein the alkali metal carbonate is mixed in an amount of 0.5 to 10% by mole based on the total amount of lithium carbonate powders, the silicon dioxide powders and the alkali metal carbonate powders.

* * * * *